US009317250B2

(12) United States Patent
Goveas et al.

(10) Patent No.: US 9,317,250 B2
(45) Date of Patent: Apr. 19, 2016

(54) FLOATING POINT MULTIPLY-ADD UNIT WITH DENORMAL NUMBER SUPPORT

(71) Applicant: Advanced Micro Devices, Inc., Sunnyvale, CA (US)

(72) Inventors: Kelvin D. Goveas, Austin, TX (US); Debjit Das Sarma, San Jose, CA (US); Scott A. Hilker, San Jose, CA (US); Hanbing Liu, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 457 days.

(21) Appl. No.: 13/674,220

(22) Filed: Nov. 12, 2012

(65) Prior Publication Data
US 2014/0136587 A1    May 15, 2014

(51) Int. Cl.
  *G06F 7/483*   (2006.01)
  *G06F 7/499*   (2006.01)
  *G06F 7/544*   (2006.01)

(52) U.S. Cl.
  CPC ............ *G06F 7/483* (2013.01); *G06F 7/49936* (2013.01); *G06F 7/5443* (2013.01)

(58) Field of Classification Search
  None
  See application file for complete search history.

(56) References Cited

U.S. PATENT DOCUMENTS

2002/0194240 A1* 12/2002 Pangal et al. ................. 708/501

OTHER PUBLICATIONS

1FPF0H,FPF0L,FPF1H,FPF1L—FMAC BLM Modules, FPF Microarchitecture Specification 1.1, Publication 40481, Sep. 5, 2008; pp. 1-36.
FPU Implementations with Denormalized Numbers; Eric M. Schwarz, Member, IEEE, Martin Schmookler, Senior Member, IEEE, and Son Dao Trong; IEEE Transactions on Computers, vol. 54, No. 7, Jul. 2005, pp. 825-836.

* cited by examiner

*Primary Examiner* — Michael D Yaary (57) ABSTRACT

The present application provides a method and apparatus for supporting denormal numbers in a floating point multiply-add unit (FMAC). One embodiment of the FMAC is configurable to add a product of first and second operands to a third operand. This embodiment of the FMAC is configurable to determine a minimum exponent shift for a sum of the product and the third operand by subtracting a minimum normal exponent from a product exponent of the product. This embodiment of the FMAC is also configurable to cause bits representing the sum to be left shifted by the minimum exponent shift if a third exponent of the third operand is less than or equal to the product exponent and the minimum exponent shift is less than or equal to a predicted left shift for the sum.

20 Claims, 6 Drawing Sheets

FLOATING POINT MULTIPLY-ADD UNIT WITH DENORMAL NUMBER SUPPORT

BACKGROUND

This application relates generally to processor-based systems, and, more particularly, to supporting denormal numbers in a processor-based system.

Processor-based systems such as central processing units (CPUs), graphics processing units (GPUs), or accelerated processing units (APUs) represent floating-point numbers using strings of bits. For example, a floating-point number can be represented using a signed digit string of a given length in a given base (or radix). The digit string is referred to as the significand, coefficient, or the mantissa. The length of the significand determines the precision of the floating-point number representation. The radix point position is assumed to be somewhere within the significand—often just after or just before the most significant digit or to the right of the rightmost (least significant) digit. The floating-point representation also includes a signed integer exponent, which may also be referred to as the characteristic or scale of the floating point number. The exponent modifies the magnitude of the number. To derive the value of the floating point number, the significand is multiplied by the base raised to the power of the exponent, which is equivalent to shifting the radix point from its implied position by a number of places equal to the value of the exponent—to the right if the exponent is positive or to the left if the exponent is negative.

The IEEE 754 binary point standard defines a set of normalized numbers using the format:

$$X = (-1)^{X_s} * 1 \cdot X_f * 2^{X_e - bias}$$

where X is the value of the normalized number, $X_s$ is the sign bit, $X_f$ is the fractional part of the significand or mantissa, $X_e$ is the exponent, and bias is the bias of the format. Depending on the format of the number, the bias may be set to values such as 127, 1023, or 16,383.

Normalized floating-point numbers cannot be used to represent numbers in the range from just below $\pm 2^{-bias+1}$ to zero. Numbers in this range are referred to as denormalized numbers and they can be represented using a sign bit and mantissa bits. For example, the IEEE 754 binary point standard defines a set of denormalized numbers using the format:

$$X = (-1)^{X_s} * 0 \cdot X_f * 2^{1-bias}, X_e = 0, X_f \neq 0$$

The denormal format differs from a normal number because the implied bit is "0" and the exponent is forced up by 1 to a value of Emin, which is equal to −126, −1022, or −16,382, depending on the format.

SUMMARY OF EMBODIMENTS

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In some embodiments, an apparatus is provided for supporting denormal numbers in a floating point multiply-add unit (FMAC). Some embodiments of the FMAC are configurable to add a product of first and second operands to a third operand. These embodiments of the FMAC is configurable to determine a minimum exponent shift for a sum of the product and the third operand by subtracting a minimum normal exponent from a product exponent of the product. These embodiments of the FMAC are also configurable to cause bits representing the sum to be left shifted by the minimum exponent shift if a third exponent of the third operand is less than or equal to the product exponent and the minimum exponent shift is less than or equal to a predicted left shift for the sum.

In some embodiment, a method is provided for supporting denormal numbers in a floating point multiply-add unit (FMAC). Some embodiments of the method include adding a product of first and second operands to a third operand to generate a sum and determining a minimum exponent shift for the sum by subtracting a minimum normal exponent from a product exponent of the product. These embodiments of the method include left shifting bits representing the sum by the minimum exponent shift if a third exponent of the third operand is less than or equal to the product exponent and the minimum exponent shift is less than or equal to a predicted left shift for the sum.

In some embodiments, computer readable media is provided for supporting denormal numbers in a floating point multiply-add unit (FMAC). Some embodiments of the computer readable media include instructions that when executed can configure a manufacturing process used to manufacture a semiconductor device including a floating point multiply-add unit (FMAC) configurable to add a product of first and second operands to a third operand. The FMAC is configurable to determine a minimum exponent shift for a sum of the product and the third operand by subtracting a minimum normal exponent from a product exponent of the product. The FMAC is also configurable to left shift bits representing the sum by the minimum exponent shift if a third exponent of the third operand is less than or equal to the product exponent and the minimum exponent shift is less than or equal to a predicted left shift for the sum.

BRIEF DESCRIPTION OF THE DRAWINGS

The disclosed subject matter may be understood by reference to the following description taken in conjunction with the accompanying drawings, in which like reference numerals identify like elements, and in which.

While the disclosed subject matter may be modified and may take alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. The description and drawings merely illustrate the principles of the claimed subject matter. It should thus be appreciated that those skilled in the art may be able to devise various arrangements that, although not explicitly described or shown herein, embody the principles described herein and may be included within the scope of the claimed subject matter. Furthermore, all examples recited herein are principally intended to be for pedagogical purposes to aid the reader in understanding the principles of the claimed subject matter and the concepts contributed by the inventor(s) to furthering the art, and are to be construed as being without limitation to such specifically recited examples and conditions.

The disclosed subject matter is described with reference to the attached figures. Various structures, systems and devices are schematically depicted in the drawings for purposes of explanation only and so as to not obscure the disclosed embodiments with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition is expressly set forth in the specification in a definitional manner that directly and unequivocally provides the special definition for the term or phrase. Additionally, the term, "or," as used herein, refers to a non-exclusive "or," unless otherwise indicated (e.g., "or else" or "or in the alternative"). Also, the various embodiments described herein are not necessarily mutually exclusive, as some embodiments can be combined with one or more other embodiments to form new embodiments.

As discussed herein, normalized floating-point numbers cannot be used to represent numbers in the range from just below $\pm 2^{-bias+1}$ to zero. Numbers in this range may be referred to as denormalized numbers and they can be represented using a sign bit and mantissa bits, e.g., using the format defined by the IEEE 754 standard. Conventional floating-point processing units handle denormalized operands that are provided to multiply-add units by explicitly converting the denormalized operands to a normalized format. However, the conversion is typically performed outside of the floating-point pipeline, e.g., using a fault, a trap, or additional processing stages. For example, floating point multiply-add units (FMAC) include a left shifter that shifts the bits of the result of the FMAC operation leftward so that the result can be provided in normalized format. Tiny results returned by the floating-point pipeline may also be converted back to denormalized format and then rounded, but the conversion/rounding steps are also performed outside the floating-point pipeline, e.g., using a fault, a trap, or other additional processing stages. For example, performing a denormalizing right shift and round on a tiny result adds logic to the critical timing path, or requires additional pipe stages, or uses faults or traps to invoke processing outside the pipeline, or some combination thereof. The registers that store denormalized numbers can be distinguished from the registers that are storing normalized numbers by including a tag bit that can be set to tag the registers that store the denormalized numbers. This technique may be referred to as "register file tagging."

At least in part to address these drawbacks in the conventional practice, some embodiments process floating point denormalized operands natively inside a floating point multiply-add processing unit (FMAC) without adding additional cycles to the execution latency. In some embodiments, the FMAC is configured to return the result of a floating-point multiply-add operation that adds a third operand (an addend) to a product of a first operand and a second operand. The FMAC may determine a left shift for the bits representing the mantissa of the result using an estimated left shift for the sum (which may be generated by a leading zero anticipator) if the addend is smaller than or equal to the product. The left shift may be set equal to the alignment shift needed to right shift the addend to line up with the product prior to the addition if the addend is larger than the product.

Denormal support adds a third potential source for the left shift: the minimum exponent shift that may be obtained by subtracting the minimum normal exponent from the product exponent. In some embodiments, the left shift is set equal to a minimum exponent shift when the third exponent is less than or equal to the product exponent and the minimum exponent shift is less than or equal to a predicted left shift provided by a leading zero anticipator. The minimum exponent shift corresponds to a left shift that decrements the product exponent to the minimum exponent. Alternatively, the left shift may be set to the predicted left shift provided by the leading zero anticipator when the predicted left shift is greater than the minimum exponent shift and the third exponent is smaller than or equal to the product exponent. The left shift may be set to a previously determined right shift of the third operand when the third exponent is greater than the product exponent. In some embodiments, the estimate of the left shift can be performed outside the critical timing path. For example, logic used to estimate the left shift can be distributed over multiple pipe stages or performed concurrently with operations in the critical timing path. Embodiments of these techniques can be used to add support for denormalized numbers to a floating point (FP) multiply-add unit (FMAC) without register file tagging so as to allow native processing of denormalized numbers for add/subtract, multiply, and multiply-add/subtract, without impacting the execution latency of the unit for any of these operations.

Figure 1:
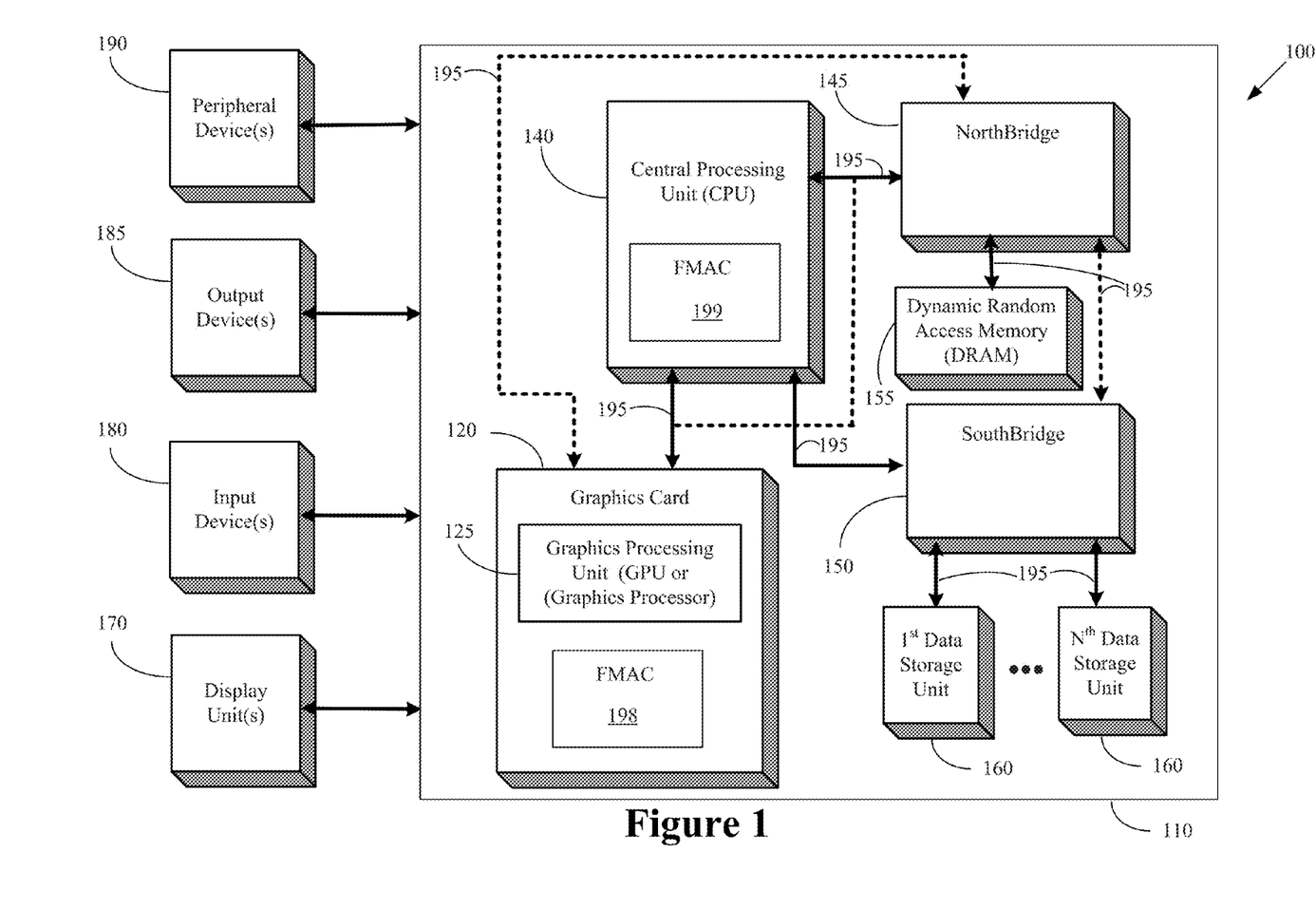
FIG. 1 conceptually illustrates an example of a computer system, according to some embodiments.

FIG. 1 conceptually illustrates one exemplary embodiment of a computer system 100. In various embodiments, the computer system 100 may be a personal computer, a laptop computer, a handheld computer, a netbook computer, a mobile device, a tablet computer, a netbook, an ultrabook, a telephone, a personal data assistant (PDA), a server, a mainframe, a work terminal, or the like. The computer system includes a main structure 110 which may be a computer motherboard, system-on-a-chip, circuit board or printed circuit board, a desktop computer enclosure or tower, a laptop computer base, a server enclosure, part of a mobile device, tablet, personal data assistant (PDA), or the like. The computer system 100 may run an operating system such as Linux, Unix, Windows, Mac OS, or the like.

As illustrated, the main structure 110 includes a graphics card 120. For example, the graphics card 120 may be an ATI Radeon™ graphics card from Advanced Micro Devices ("AMD"). The graphics card 120 may be connected on a Peripheral Component Interconnect (PCI) Bus (not shown), PCI-Express Bus (not shown), an Accelerated Graphics Port (AGP) Bus (also not shown), or other electronic or communicative connection. The graphics card 120 may contain a graphics processing unit (GPU) 125 used in processing graphics data. The graphics card 120 may be referred to as a circuit board or a printed circuit board or a daughter card or the like.

The computer system 100 shown in FIG. 1 also includes a central processing unit (CPU) 140, which is electronically or communicatively coupled to a northbridge 145. The CPU 140 and northbridge 145 may be housed on the motherboard (not shown) or some other structure of the computer system 100. It is contemplated that in certain embodiments, the graphics card 120 may be coupled to the CPU 140 via the northbridge 145 or some other electronic or communicative connection. For example, CPU 140, northbridge 145, GPU 125 may be included in a single package or as part of a single die or "chip". The northbridge 145 may be coupled to a system RAM (or DRAM) 155 or the system RAM 155 may be coupled directly to the CPU 140. The system RAM 155 may be of any RAM type known in the art; the type of RAM 155 may be a matter of design choice. The northbridge 145 may be connected to a southbridge 150. The northbridge 145 and southbridge 150 may be on the same chip in the computer system 100, or the northbridge 145 and southbridge 150 may be on different chips. The southbridge 150 may be connected to one or more data storage units 160. The data storage units 160 may be hard drives, solid state drives, magnetic tape, or any other writable media used for storing data. The CPU 140, northbridge 145, southbridge 150, GPU 125, or RAM 155 may be a computer chip or a silicon-based computer chip, or may be part of a computer chip or a silicon-based computer chip. The various components of the computer system 100 may be operatively, electrically or physically connected or linked with a bus 195 or more than one bus 195.

The computer system 100 may be connected to one or more display units 170, input devices 180, output devices 185, or peripheral devices 190. These elements may be internal or external to the computer system 100, and may be wired or wirelessly connected. The display units 170 may be internal or external monitors, television screens, handheld device displays, touchscreens, and the like. The input devices 180 may be any one of a keyboard, mouse, track-ball, stylus, mouse pad, mouse button, joystick, touchscreen, scanner or the like. The output devices 185 may be any one of a monitor, printer, plotter, copier, or other output device. The peripheral devices 190 may be any other device that can be coupled to a computer. Example peripheral devices 190 may include a CD/DVD drive capable of reading or writing to physical digital media, a USB device, Zip Drive, external hard drive, phone or broadband modem, router/gateway, access point or the like.

The graphics card 120 and the CPU 140 may implement floating point multiply-add units (FMACs) 198, 199, respectively. As discussed herein, the computer system 100 may represent normalized numbers using the format:

$$X=(-1)^{X_s}*1 \cdot X_f * 2^{X_e-bias}$$

where X is the value of the normalized number, $X_s$ is the sign bit, $X_f$ is the fractional part of the significand or mantissa, $X_e$ is the exponent, and bias is the bias of the format. Denormalized numbers may be represented using the format:

$$X=(-1)^{X_s}*0 \cdot X_f * 2^{1-bias}, X_e=0, X_f \neq 0$$

The denormal format differs from a normal number because the implied bit is "0" and the exponent is forced up by 1 to a value of Emin, which is equal to −126, −1022, or −16,382, depending on the format.

In some embodiments, the FMACs 198, 199 are configurable to carry out operations on floating point numbers such as addition and multiplication. For example, the FMACs 198, 199 may receive three floating-point operands as input (A, B, and C) may return a floating-point operand or result corresponding to C+A*B, which may be written as srcC+srcA*srcB. Addition of srcC and srcA may be performed by setting srcB to 1.0 and multiplication of srcA and srcB may be performed by setting srcC to 0.0. Multiplication therefore falls under the UseLza=1 case, whereas addition can be either UseLza=0 or 1, depending on the relative values of srcC and srcA. In some embodiments, the FMACs 198, 199 are configurable to determine a minimum exponent shift for a sum of the product (srcA*srcB) and the third operand (srcC) by subtracting a minimum normal exponent from a product exponent of the product. The bits that represent the sum (srcC+srcA*srcB) may then be left shifted by the minimum exponent shift if a third exponent of the third operand (srcC) is less than or equal to the product exponent and the minimum exponent shift is less than or equal to a predicted left shift for the sum. The computer system 100 may therefore be able to process floating point denormalized operands natively inside the FMACs 198, 199 without incurring additional cycles to the execution latency and without register file tagging.

Figure 2:
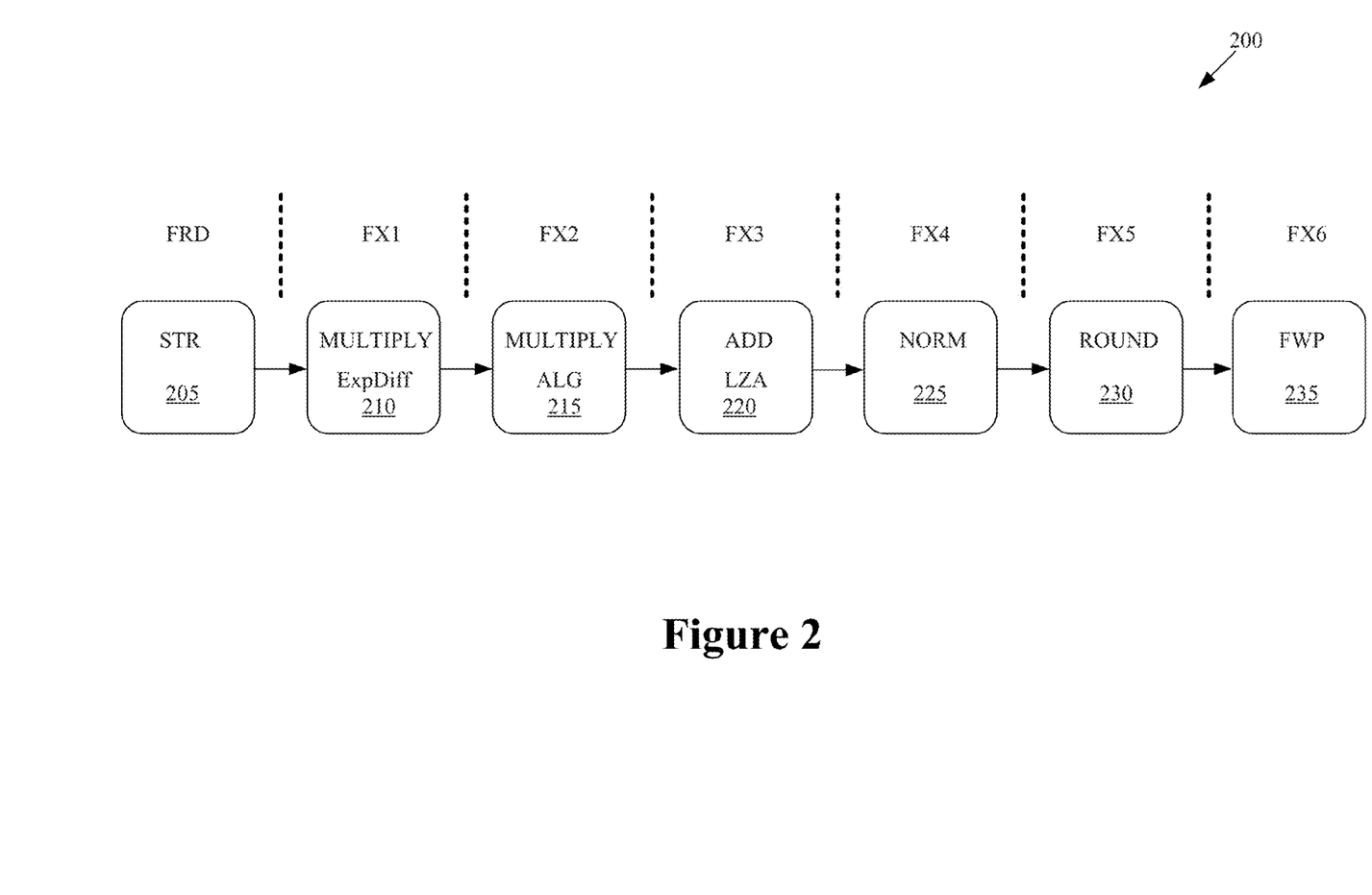
FIG. 2 conceptually illustrates an example of a pipeline that may be implemented in a floating-point multiply-add processing unit such as the FMACs shown in FIG. 1, according to some embodiments.

FIG. 2 conceptually illustrates an example of a pipeline 200 that may be implemented in a floating-point multiply-add processing unit such as the FMACs 198, 199 shown in FIG. 1, according to some embodiments. As illustrated, the FMAC receives operands in the decoding stage (FRD) 205. Logic (STR) in the decoding stage 205 may select between register files and bypassed operands. Multiplication or alignment operations may be distributed across the first and second stages (FX1, FX2) 210, 215. Addition operations or leading zero anticipation (LZA) may be performed in the third stage (FX3) 220. The result can be normalized in the fourth stage (FX4) 225, rounding may be performed in the fifth stage (FX5) 230, and the result/status may be stored in the sixth stage (FX6) 235. Persons of ordinary skill in the art having benefit of the present disclosure should appreciate that the pipeline 200 is intended to be an example and operations may be distributed across multiple stages and/or different operations may be performed in different stages.

Figure 3A:
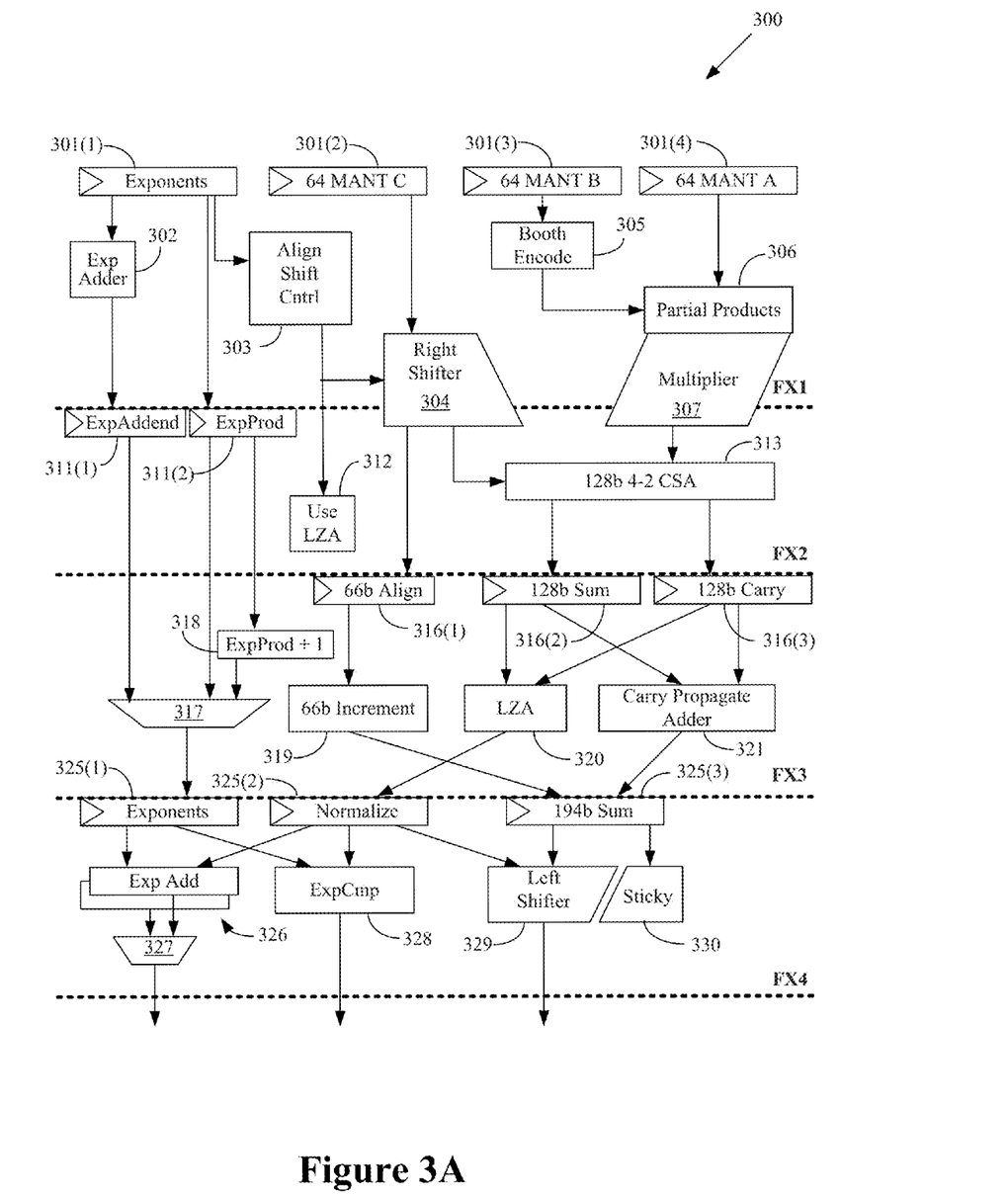
FIG. 3A conceptually illustrates four stages of an example of a FMAC unit, according to some embodiments.
Figure 3B:
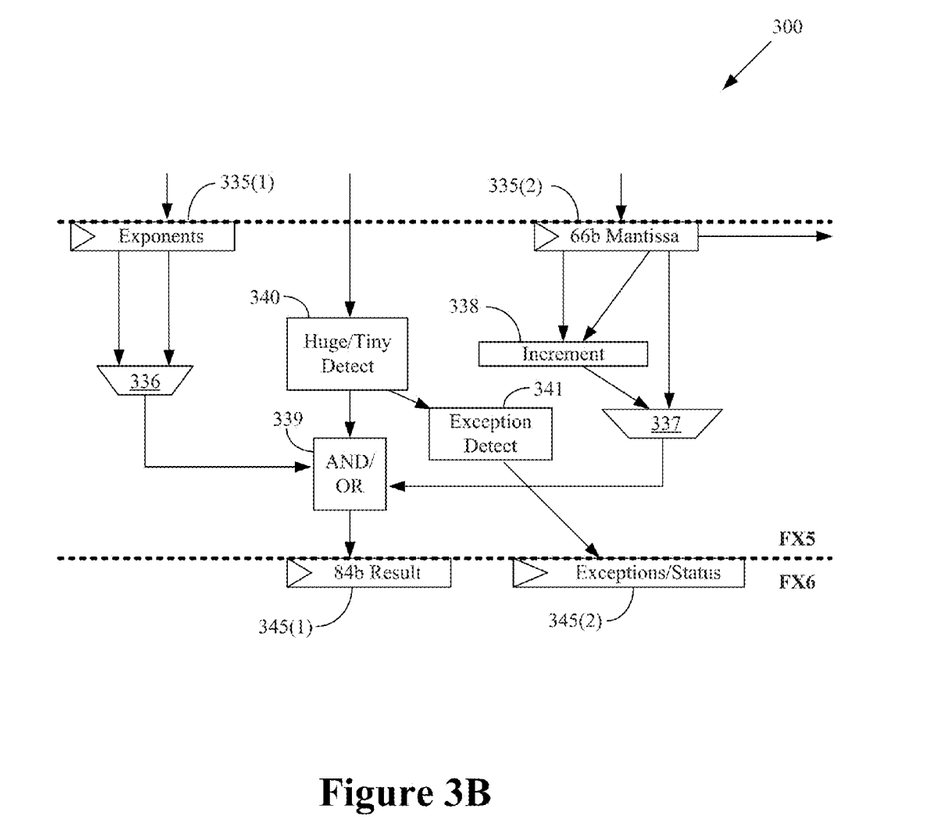
FIG. 3B conceptually illustrates two subsequent stages of the example of the FMAC unit shown in FIG. 3A, according to some embodiments.

FIGS. 3A and 3B conceptually illustrate a FMAC unit 300. In the illustrated embodiment, source operands are provided to the first stage (FX1) using a register 301(1) to store the exponents for the addend (srcC) and the multiplicand and multiplier(srcA, srcB). Registers 301(2-4) are used to store the values of the mantissas of srcA, srcB, and srcC. The exponent of the product is determined using an 4-input exponent adder 302. An alignment shift controller 303 is used to control the alignment shift. In some embodiments, the alignment shift controller 303 determines a difference between the exponents of the addend and the product (ExpA+ExpB−ExpC−ExpBias+ShifterOffset), which gives the amount the addend mantissa must be shifted to properly align with the significance of the product mantissa. The alignment shift controller 303 may signal the determined shift to a right shifter 304. The right shifter 304 only shifts to the right. A shift of zero leaves the addend MSB 66 bits higher than the product MSB for extended precision or double precision and 26 bits higher for single precision.

In some embodiments, Booth encoding is used to generate partial products in the multiplication path. For example, a Booth encoder 305 provides signaling to a partial product unit 306 that provides partial products to a multiplier 307. In some embodiments, thirty-three partial products are generated using radix-4 Booth encoding and multiple levels of 4:2 compressors in the multiplier carry-save tree may be used to reduce the product to 9 partial products. However, persons of ordinary skill in the art having benefit of the present disclosure should appreciate that other encoding techniques may be used in the multiplication path. As illustrated, the right shifter 304 and the multiplier 307 provide results to the second stage (FX2).

The second stage (FX2) includes registers 311(1-2) for receiving the exponent of the addend (srcC) and the exponent of the product (srcA*srcB), respectively. The second stage (FX2) also includes a logic block 312 that receives signals from the alignment shift controller 303 to determine whether to use LZA. As discussed herein, addition may be performed by setting srcB to 1.0 and multiplication may be performed by setting srcC to 0.0. Multiplication therefore falls under the UseLza=1 case so that leading zero anticipation is used, whereas addition can fall under either UseLza=0 or 1 depending on the relative value of srcC and srcA. A carry-save-addition (CSA) unit 313 is included in the second stage (FX2) to determine the carry bit and the sum bits used for addition. In the illustrated embodiment, the CSA unit 313 is a 128-bit element.

The third stage (FX3) includes registers 316(1-3) for receiving alignment bits, sum bits, and carry bits, respectively. Multiplexer 317 receives exponent values of the registers 311 as input in combination with the incremented exponent of the products from the block 318. The alignment values in the registers 316(1) may also be incremented in the block 319. The third stage (FX3) includes an LZA block 320 that may be used to predict the location of the most significant bit of the result of the floating-point addition and a carry-propagate adder 321. Techniques for implementing the LZA block 320 or the carry-propagate adder 321 are known in the art and in the interest of clarity only those aspects of these elements that are relevant to the claimed subject matter are discussed herein.

The fourth stage (FX4) shown in FIG. 3A includes an exponent register 325(1) for receiving exponent bits, a normalize register 325(2) for receiving normalization bits, and a sum register 325(3) for receiving sum bits. An exponent addition block 326 includes two adders for computing the exponent adjustment required due to the normalization shift. The exponent addition block 326 receives input from the exponent register 325(2) and the normalization register 325(2) and each adder provides output to a multiplexer 327 for selecting the appropriate result. An exponent comparator block 328 may be used to begin the detection of underflow or overflow conditions by comparing the exponent results to a threshold that indicate tiny results, huge result, massive underflow, and the like for different potential final exponent values. A left shifter 329 may be used to normalize the mantissa and a sticky block 330 may be used to determine the value of a sticky bit by accumulating bits that do not contribute to the mantissa of the result.

Rounding of the result may be performed in the fifth stage (FX5) shown in FIG. 3B, which includes registers 335(1-2) for receiving exponent bits and mantissa bits, respectively. A multiplexer 336 may be used to select between the incremented, unchanged, or decremented values of the exponent and multiplexer 337 may be used in combination with an increment block 338 to shift the mantissa by 0 or 1 to normalize the result. The normalize result may be passed to an AND/OR block 339, which can pass through the results or override the results with a constant. The output from the AND/OR block 339 may be provided to a result register 345(1) in the sixth stage (FX6). Overflows or underflows may be detected in the huge/tiny detect block 340 and results from the huge/time detect block 340 may be passed to an exception detect block 341 to detect any exceptions that may occur. The exception status can then be written to an exception/status register 345(2) in the sixth stage (FX6).

Figure 4:
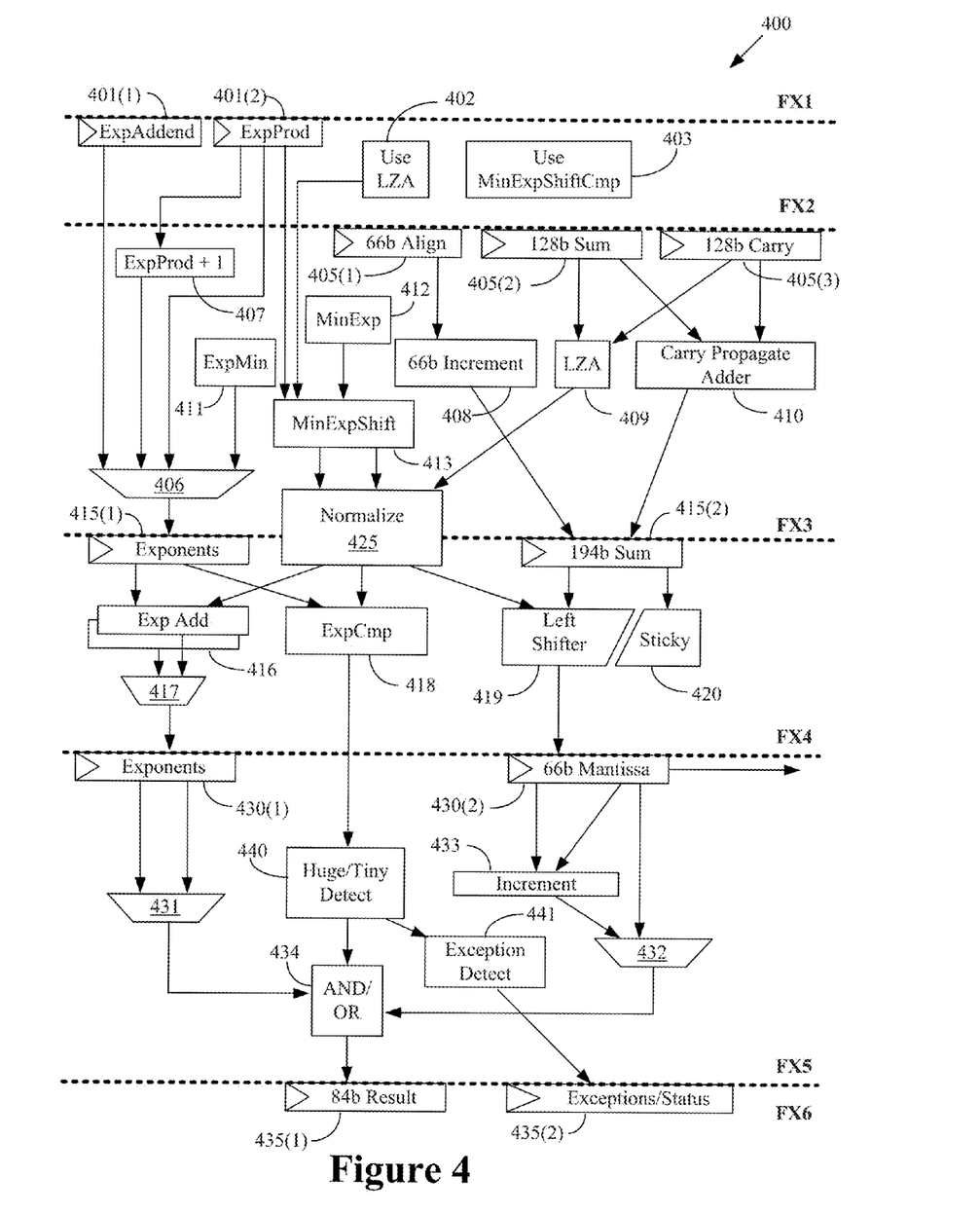
FIG. 4 conceptually illustrates an example of a FMAC unit that distributes normalization functionality across multiple stages, according to some embodiments.

FIG. 4 conceptually illustrates a FMAC unit 400, according to some embodiments. In some embodiments, the first stage (FX1) of the FMAC unit 400 may be configured in substantially the same manner as the first stage (FX1) of the FMAC unit 300. Thus, in the interest of clarity, the specific elements in the first stage of the FMAC unit 400 not depicted in FIG. 4.

The second stage (FX2) of the second exemplary embodiment includes an ExpAddend register 401(1) for receiving the exponent of the addend (srcC) and an ExpProd register 401(2) for receiving the exponent of the product (srcA*srcB), respectively. The second stage (FX2) also includes a logic block 402 that receives signals from the alignment shift controller (not shown in FIG. 4) in the first stage (FX1) to determine whether to use LZA. The second stage (FX2) of the FMAC unit 400 may also implement functionality that corresponds to functionality depicted in the second stage (FX2) of the FMAC unit 300, which may not be depicted in FIG. 4 in the interest of clarity. The second stage (FX2) of the FMAC unit 400 differs from the FMAC unit 300 by incorporating logic block 403 that is used to determine whether to use the minimum exponent shift comparison. For example, the logic block 403 may generate a signal that indicates when to enable a comparison between the left shift indicated by the leading zero anticipator and a minimum exponent shift used for denormal support, as discussed herein. The signal generated by the logic block 403 may be provided to entities in the fourth stage (FX4), as discussed herein.

The third stage (FX3) shown in FIG. 4 includes registers 405(1-3) for receiving alignment bits, sum bits, and carry bits, respectively. Multiplexer 406 receives exponent values of the ExpAddend register 401(1) and the ExpProd register 401(2) as input in combination with the incremented exponent of the products from the block 407. The alignment values in the registers 405(1) may also be incremented in the block 408. The third stage (FX3) also includes an LZA block 409 that may be used to predict the location of the most significant bit of the result of the floating-point addition and a carry-propagate adder 410.

The third stage (FX3) of the FMAC unit 400 differs from the third stage (FX3) of the FMAC unit 300 in at least the following ways. In addition to the three inputs previously discussed, the multiplexer 406 also receives an input corresponding to the minimum exponent for denormal numbers from the block 411. Exemplary minimum exponents may be equal to −126, −1022, or −16,382, depending on the format. The value ExpMin may be used when the exponent of the product, ProdExp<MinExp−67, in which case it may not be necessary to left shift because the product is already in the 'sticky' bit part of the result. The third stage (FX3) also includes a MinExpShift block 413 to determine a minimum exponent shift value that can be used to "rail" the shift to prevent left shifting that would cause the exponent of the result to be decremented past the denormal exponent value. As illustrated, the MinExpShift block 413 has three inputs—the UseLZA indication from the logic block 402, the ExpProd register 401(2), and the MinExp block 412 that provides a configurable constant value equal to the minimum exponent. The MinExpShift block 413 may include an adder to perform ExpProd[17:0]−MinExp[17:0]−>MinExpShiftCnt[7:0]. The MinExpShift block 413 has two outputs: MinExpShiftCntf [7:0] and 1-bit UseMinExpShiftCmp value that enables the compare-and-shift between the left shift indicated by the leading zero anticipator (LzaCnt[7:0]) and a minimum exponent shift used for denormal support (MinExpShiftCnt[7:0]). When MinExpShiftCmp is false, the LzaCnt value is used to determine the left shift.

The fourth stage (FX4) shown in FIG. 4 includes an exponents register 415(1) for receiving exponent bits and a sum register 415(2) for receiving sum bits. An exponent addition block 416 includes two adders for computing the exponent adjustment required due to the normalization shift. The exponent addition block 416 receives input from the exponent register 415(1) and each adder provides output to a multiplexer 417 for selecting the appropriate result. One adder generates (ExpProd−LzaCnt−1) and the other adder generates (ExpProd−LzaCnt). The adders perform a 2's complement of the LzaCnt to subtract this value from ExpProd. For example, the 2's complement of LzaCnt=~LzaCnt[7:0]+0x1. One adder eliminates the +1 into carry-in whereas the other adder does not. The two exponents are generated because the LzaCnt can be off by one leading zero, e.g., the normalize block 425 may predict one less leading zero than is actually needed to correctly normalize the result. The value from the first adder (ExpProd−LzaCnt−1) may be chosen in the fifth stage (FX5) if the leading bit of the result is zero post-left-shift. Otherwise, the value from the second adder (ExpProd−LzaCnt) may be chosen.

An exponent comparator block 418 may be used to begin the detection of underflow or overflow conditions by comparing the exponent results to thresholds that indicate tiny results, huge results, massive underflows, and the like for different potential final exponent values. A left shifter 419 may be used to normalize the mantissa and a sticky block 420 may be used to determine the value of a sticky bit by accumulating bits that do not contribute to the mantissa of the result.

The FMAC unit 400 differs from the FMAC unit 300 by including a normalize block 425 that is implemented in the third and fourth stages (FX3, FX4) and receives inputs from the MinExpShift block 413 and the LZA block 409. The normalize block 425 provides output to the exponent addition block 416, the exponent comparison block 418, and the left shifter 419. As illustrated, the left shifter 419 uses the signaling generated and provided by the normalize block 425 to perform a 194-bit left shift to normalize the result to a 65-bit mantissa that includes one additional "guard" bit to the right of the LSB of the result. The guard bit and the sticky bit are used together with rounding mode to determine rounding direction. The value for the left shift may be set equal to the right shift generated in the second stage (e.g., the right shift generated by the right shifter 304 shown in FIG. 3A when Addend (srcC)>Product (srcA*srcB). The value for the left shift maybe set equal to the value determined by the LZA block 409 in the third stage (FX3) when Addend<=Product. In this case, the LZA block 409 may compute the number of leading zeroes to account for potential cancellation that may occur if the sign of the addend is different than that of the product, which is referred to as an effective subtract.

In order to support denormalized numbers, the normalization shift generated in the normalize block 425 may also be set equal to the difference between the minimum normal exponent and the product exponent, which is referred to herein as the "minimum exponent shift count." The minimum exponent shift count is the left shift count that when decremented from the product exponent would result in the minimum normal exponent. The normalize block 425 indicates a left shift that is equal to MinExpShiftCnt when ((Addend<=Product) & (MinExpShiftCnt<=LZA left shift)). In some embodiments, deciding whether to left shift by MinExpShiftCnt or the left shift value generated by the LZA block 409 may be timing-critical because the exponent comparison introduces logic into the critical normalization shift path. In some embodiments, the normalization shift is broken down into four phases.

The LZA block 409 may be configured to provide shift selects that can be applied to each of the four phases without any further processing. In some embodiments, the LZA shift is encoded into binary format and the normalize block 425 compares the LZA shift with the MinExpShift in a staged manner. In some embodiments, 4-bit decoded versions of minimum exponent shift count, MinExpShift[7:0], are available in each stage and the LZA values are compared with the 4-bit decoded versions because the LZA values may be more timing-critical than the minimum exponent shift count, MinExpShift, which is available from a flop.

Figure 5:
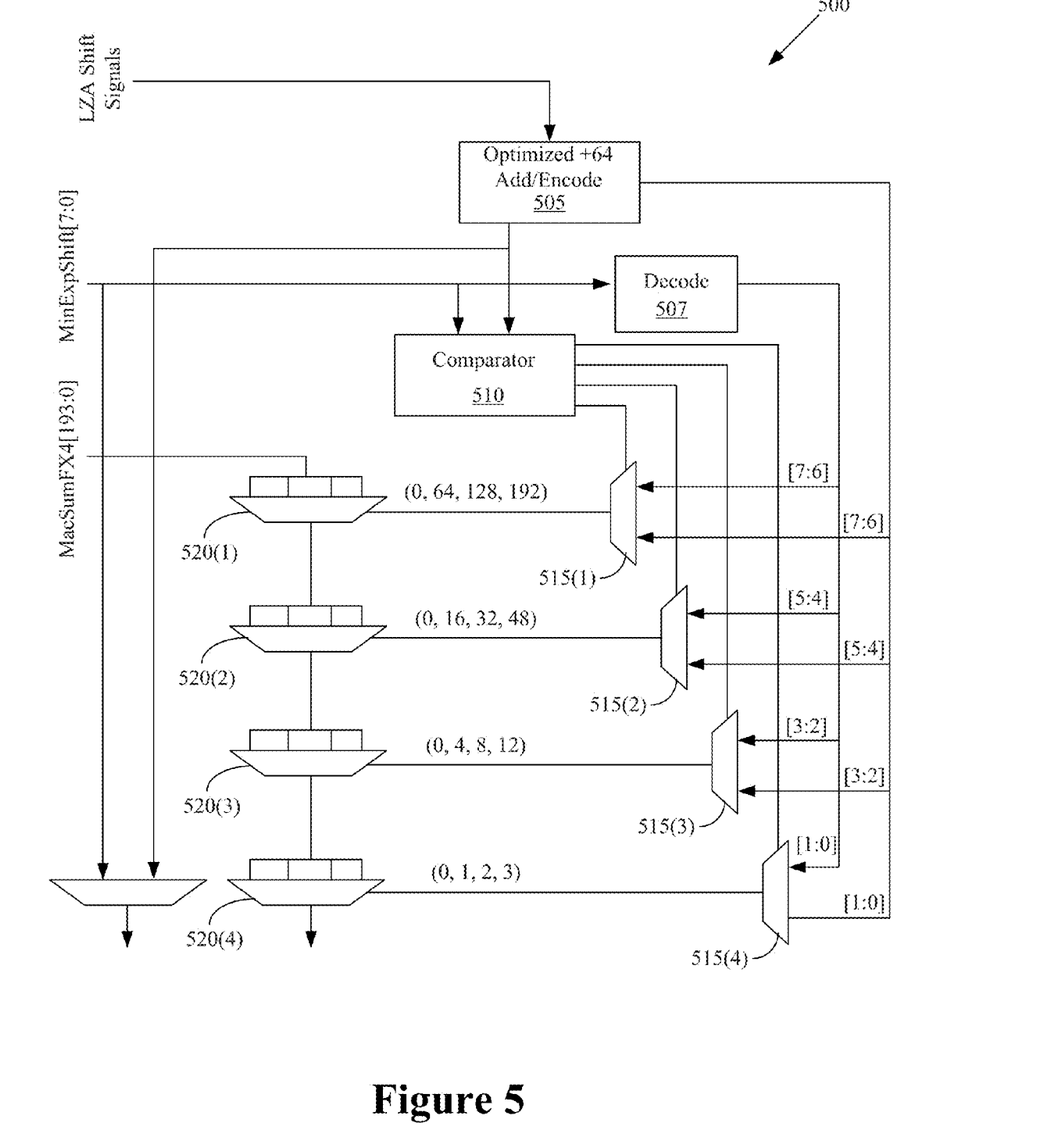
FIG. 5 conceptually illustrates an example of logic for selecting a left shift and normalizing a result that may be implemented in the FMAC shown in FIG. 4, according to some embodiments.

FIG. 5 conceptually illustrates an example of logic 500 for selecting a left shift and normalizing a result. Embodiments of the logic 500 may be implemented in the normalize block 425. As illustrated, the logic 500 receives three inputs: MinExpShift[7:0], LZA shift signals, and MacSumFX4[193:0]. The value of MacSumFX4 is a value of the sum generated using sum and carry information such as the values in the registers 405(2-3) shown in FIG. 4. The logic 500 is configured to normalize MacSumFX4 by left shifting by a number of bits indicated by either MinExpShift[7:0] or the LZA shift signals.

In some embodiments, the LZA shift signals are provided to an adder/encoder, such as the optimized +64 add/encode block 505, because the LZA shift signals may not be in binary format. For example, the input to the LZA block 409 shown in FIG. 4 may be a vector called Lza_FX3 [128:1] which in turn may generated from the sum and carry vectors from the multiplier. The input may be split up into Lza_FX3[128:65] and Lza_FX3 [64:1]. Some embodiments of the optimized +64 add/encode block 505 are configurable to encode the LZA left shift signals into an 8-bit LzaShift[7:0] together with a +64 to indicate a shift of 0 to 193. For example, the LZA Shift Signal that is output from the LZA block 409 shown in FIG. 4 may be a 128-bit bit-string indicating the position of the first "1" in the bit-string. To determine the number of leading zeros in the MacSumFX4[193:0] and hence the left shift count used to normalize MacSumFX4 [193:0], the number of leading zeros in the 129-bit LZA Shift Signal is encoded to add 64 (i.e. +64 add/encode) since the first 64 bits are zeros by default in this case. The output of add/encode block 505 is LzaShift[7:0] to indicate a shift of 0 to 193 and LzaShift[7:0] is a decoded signal. A decoder 507 may be used to decode the bits for MinExpShift.

The MinExpShift[7:0] bits and the LzaShift[7:0] bits may be provided to a comparator 510 and inputs of multiplexers 515. Each of the multiplexers 515 receives two bits of input from the MinExpShift and LzaShift vectors, as shown in FIG. 5. The output of the comparator 510 is used to select the input from the MinExpShift vector or the LzaShift vector based on a comparison of the values of these vectors. The output of the multiplexers 515 are provided to corresponding multiplexers 520 and used as the select signal for the multiplexers. The select signal indicates a shift that is applied to MacSumFX4. For example, multiplexer 520(1) may provide a left shift of 0, 64, 128, or 192, multiplexer 520(2) may provide a left shift of 0, 16, 32, or 48, multiplexer 520(3) may provide a left shift of 0, 4, 8, or 12, and multiplexer 520(4) may provide a left shift of 0, 1, 2, or 3.

The process of left shifting may be broken up into four phases and each phase may include operations performed by the comparator 510 and sets of the multiplexers 515, 520. In some embodiments, the first phase includes operations performed by the multiplexers 515(1), 520(1) using signals generated by the comparator 510, the second phase includes operations performed by the multiplexers 515(2), 520(2) using signals generated by the comparator 510, the third phase includes operations performed by the multiplexers 515 (3), 520(3) using signals generated by the comparator 510, and the fourth phase includes operations performed by the multiplexers 515(4), 520(4) using signals generated by the comparator 510. The different phases may also be distributed across different stages of a pipeline in the floating-point unit. For example, the normalize block 425 may implement some of the phases as part of the third stage (FX3) and the remaining phases as part of the fourth stage (FX4) shown in FIG. 4. Some embodiments of the normalize block 425 may therefore be able to determine whether to left shift the sum by the minimum exponent shift, the predicted left shift, or the alignment shift concurrently with operations in a critical timing path of the FMAC. The normalize block 425 may also be able to handle denormalized numbers without explicit register file tagging.

One example implementation of the multiple phase left shift can be represented by the following pseudo code:

```
LzaShiftEnc[7:0] = encode(LzaShift64[3:0],
    LzaShift16[3:0], LzaShift4[3:0], LzaShift1[3:0]};
Phase 1: shift by {0, 64, 128, 192}
LzaCmpLT64 = LzaShiftEnc[7:6] < MinExpShift[7:6];
EqualShift64 = LzaShiftEnc[7:6] == MinExpShift[7:6];
UseLzaShift64 = LzaCmpLT64;
If (UseLzaShift64)
    Shift64[3:0] = LzaShift64[3:0];
Else
    Shift64[3:0] = {1'b1 << MinExpShift[7:6] };
Phase 2: shift by {0, 16, 32, 48}
LzaCmpLT16 = LzaShiftEnc[5:4] < MinExpShift[5:4];
EqualShift16 = LzaShiftEnc[7:4] == MinExpShift[7:4];
UseLzaShift16 = UseLzaShift64 | EqualShift64 &
    LzaCmpLT16;
If (UseLzaShift16)
    Shift16[3:0] = LzaShift16[3:0];
Else
    Shift16[3:0] = {1'b1 << MinExpShift[5:4] };
Phase 3: shift by {0, 4, 8, 12}
LzaCmpLT04 = LzaShiftEnc[3:2] < MinExpShift[3:2];
EqualShift04 = LzaShiftEnc[7:2] == MinExpShift[7:2];
UseLzaShift04 = UseLzaShift16 | EqualShift16 &
    LzaCmpLT04;
If (UseLzaShift04)
    Shift04[3:0] = LzaShift04[3:0];
Else
    Shift04[3:0] = {1'b1 << MinExpShift[3:2] };
Phase 4: shift by {0, 1, 2, 3}
LzaCmpLT01 = LzaShiftEnc[1:0] < MinExpShift[1:0];
UseLzaShift01 = UseLzaShift04 | EqualShift04 &
    LzaCmpLT01;
If (UseLzaShift04 | EqualShift01 & UseLzaShift01)
    Shift01[3:0] = LzaShift01[3:0];
Else
    Shift01[3:0] = {1'b1 << MinExpShift[1:0] };
```

In some embodiments, logic 500 also includes a multiplexer 525 that is used to select between the MinExpShift[7:0] and the LzaShift[7:0] so that the appropriate values can be supplied to the other blocks in the fourth stage, such as the exponent addition block 416, the exponent comparison block 418, or the left shifter 419 shown in FIG. 4. Embodiments of the phased compare-and-shift described herein allow a tiny result to be returned in denormalized format through 'railing' the shift by selection of the MinExpShift which prevents any further left shifting that would cause the exponent of the result to be decremented past the denormal exponent. Some embodiments include a configuration bit that can be set to disable denorm support and allow reversion to legacy behavior of returning tiny result in normalized format.

Referring back to FIG. 4, rounding of the result may be performed in the fifth stage (FX5), which includes registers 430(1-2) for receiving exponent bits and mantissa bits, respectively. A multiplexer 431 may be used to select between the incremented or unchanged values of the exponent. Multiplexer 432 may be used in combination with an increment block 433 to shift the mantissa by 0 or 1 to normalize the result. The normalize result may be passed to an AND/OR block 434, which can pass on the results or override the results with a constant. The output from the AND/OR block 434 may be provided to a result register 435(1) in the sixth stage (FX6). Overflows or underflows may be detected in the huge/tiny detect block 440 and results from the huge/tiny detect block 440 may be passed to an exception detect block 441 to detect any exceptions that may occur. The exception status can then be written to an exception/status register 435(2) in the sixth stage (FX6).

Embodiments of processor systems that provide support for denormal numbers as described herein (such as the processor system 100) can be fabricated in semiconductor fabrication facilities according to various processor designs. In some embodiments, a processor design can be represented as code stored on a computer readable media. Example codes that may be used to define and/or represent the processor design may include HDL, Verilog, and the like. The code may be written by engineers, synthesized by other processing devices, and used to generate an intermediate representation of the processor design, e.g., netlists, GDSII data and the like. The intermediate representation can be stored on computer readable media and used to configure and control a manufacturing/fabrication process that is performed in a semiconductor fabrication facility. The semiconductor fabrication facility may include processing tools for performing deposition, photolithography, etching, polishing/planarizing, metrology, and other processes that are used to form transistors and other circuitry on semiconductor substrates. The processing tools can be configured and are operated using the intermediate representation, e.g., through the use of mask works generated from GDSII data.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the methods disclosed herein are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

Furthermore, the methods disclosed herein may be governed by instructions that are stored in a non-transitory computer readable storage medium and that are executed by at least one processor of a computer system. Each of the operations of the methods may correspond to instructions stored in a non-transitory computer memory or computer readable storage medium. In various embodiments, the non-transitory computer readable storage medium includes a magnetic or optical disk storage device, solid state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A floating point multiply-add unit (FMAC) configurable to add a product of first and second operands to a third operand, wherein the FMAC comprises:

a minimum exponent determination hardware module to determine a minimum exponent shift for a sum of the product and the third operand by subtracting a minimum normal exponent from a product exponent of the product; and a left shift hardware module to cause bits representing the sum to be left shifted by the minimum exponent shift if a third exponent of the third operand is less than or equal to the product exponent and the minimum exponent shift is less than or equal to a predicted left shift for the sum.

2. The FMAC of claim 1, comprising a leading zero anticipator hardware module configurable to generate the predicted left shift for the sum.

3. The FMAC of claim 2, wherein the left shift module is to cause the bits representing the sum to be left shifted by the predicted left shift if the third operand is smaller than or equal to the product.

4. The FMAC of claim 3, wherein the left shift module to cause the bits representing the sum to be left shifted by an alignment shift if an addend is larger than the product, wherein the alignment shift is used to right shift the third operand to line up with the product prior to adding the product to the third operand.

5. The FMAC of claim 4, wherein the left shift module is to determine, concurrently with operations in a critical timing path of the FMAC, whether to left shift the sum by the minimum exponent shift, the predicted left shift, or the alignment shift.

6. The FMAC of claim 5, wherein the FMAC comprises a plurality of hardware pipeline stages, and wherein the FMAC is configurable to determine, using logic distributed over the plurality of pipeline stages, whether to left shift the sum by the minimum exponent shift, the predicted left shift, or the alignment shift using logic distributed over the plurality of pipeline stages.

7. The FMAC of claim 6, wherein the left shift module is to determine whether to left shift the sum by the minimum exponent shift, the predicted left shift, or the alignment shift without adding latency to the critical timing path of the FMAC.

8. The FMAC of claim 7, wherein the FMAC comprises a plurality of multiplexers coupled in series and configured to receive the bits representing the sum, and wherein each of the plurality of multiplexers is configurable to apply a different range of left shifts to the bits representing the sum.

9. The FMAC of claim 8, wherein the multiplexers are configured to apply a selected left shift within the multiplexer's range of left shifts in response to a select signal generated using the minimum exponent shift and the predicted left shift.

10. A method comprising:

at a hardware adder of a floating point multiply-add unit (FMAC), adding a product of first and second operands to a third operand to generate a sum;

determining, at a hardware minimum exponent determination hardware module of the FMAC, a minimum exponent shift for the sum by subtracting a minimum normal exponent from a product exponent of the product; and left shifting, at a hardware left shift module of the FMAC, bits representing the sum by the minimum exponent shift if a third exponent of the third operand is less than or equal to the product exponent and the minimum exponent shift is less than or equal to a predicted left shift for the sum.

11. The method of claim 10, comprising generating at the FMAC the predicted left shift for the sum using a leading zero anticipator.

12. The method of claim 11, wherein left shifting the bits representing the sum comprises left shifting the bits representing the sum by the predicted left shift if the third operand is smaller than or equal to the product.

13. The method of claim 12, wherein left shifting the bits representing the sum comprises left shifting the bits representing the sum by an alignment shift if an addend is larger than the product, wherein the alignment shift is used to right shift the third operand to line up with the product prior to adding the product to the third operand.

14. The method of claim 13, comprising determining, concurrently with operations in a critical timing path of athe FMAC, whether to left shift the bits representing the sum by the minimum exponent shift, the predicted left shift, or the alignment shift.

15. The method of claim 14, wherein the FMAC comprises a plurality of hardware pipeline stages, and wherein determining whether to left shift the sum by the minimum exponent shift, the predicted left shift, or the alignment shift comprises determining, using logic distributed over the plurality of pipeline stages, whether to left shift the bits representing the sum by the minimum exponent shift, the predicted left shift, or the alignment shift.

16. The method of claim 15, comprising determining whether to left shift the bits representing the sum by the minimum exponent shift, the predicted left shift, or the alignment shift without adding latency to the critical timing path of the FMAC.

17. The method of claim 16, wherein left shifting the bits representing the sum comprises left shifting the bits representing the sum using a plurality of multiplexers coupled in series and configured to receive the bits representing the sum, and wherein left shifting the bits representing the sum comprises applying a different range of left shifts to the bits representing the sum using each of the plurality of multiplexers.

18. The method of claim 17, wherein left shifting the bits representing the sum comprises applying a selected left shift within each multiplexer's range of left shifts in response to a select signal generated using the minimum exponent shift and the predicted left shift.

19. A non-transitory computer readable media including instructions that when executed can configure a manufacturing process used to manufacture a semiconductor device comprising a floating point multiply-add unit (FMAC) configurable to add a product of first and second operands to a third operand, wherein the FMAC comprises:
    a hardware minimum exponent determination module to determine a minimum exponent shift for a sum of the product and the third operand by subtracting a minimum normal exponent from a product exponent of the product; and
    a hardware left shift module to cause bits representing the sum to be left shifted by the minimum exponent shift if a third exponent of the third operand is less than or equal to the product exponent and the minimum exponent shift is less than or equal to a predicted left shift for the sum.

20. The computer readable media set forth in claim 19, further comprising instructions that when executed can configure the manufacturing process used to manufacture the semiconductor device comprising the FMAC so that the left shift module is to left shift the bits representing the sum by the predicted left shift if the third operand is smaller than or equal to the product or left shift the bits representing the sum by an alignment shift if an addend is larger than the product, wherein the alignment shift is used to right shift the third operand to line up with the product prior to adding the product to the third operand.

\* \* \* \* \*